Figure 1:
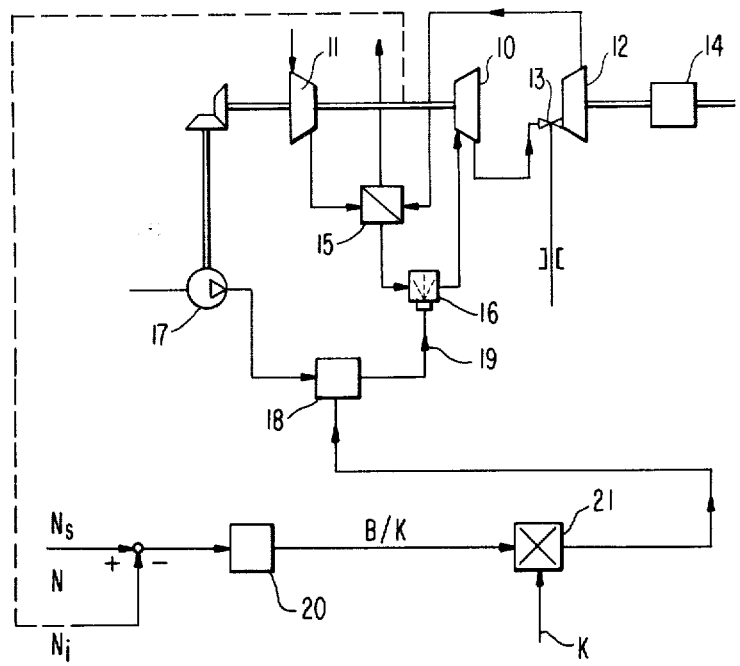

United States Patent [19]
Greune et al.

[11] 3,888,078
[45] June 10, 1975

[54] GOVERNING DEVICE FOR A GAS TURBINE SYSTEM EXEMPLIFIED BY A VEHICULAR OR AIRCRAFT ENGINE

[75] Inventors: Christian Greune, Furstenfeldbruck; Friedrich Hackl, Neu-Esting, both of Germany

[73] Assignee: Motoren-und Turbinen-Union Munchen GmbH, Germany

[22] Filed: Dec. 18, 1972

[21] Appl. No.: 316,059

[30] Foreign Application Priority Data
Dec. 17, 1971  Germany................ 2162660

[52] U.S. Cl................. 60/39.28 R; 60/39.25
[51] Int. Cl................. F02c 9/08
[58] Field of Search................ 60/39.28 T

[56] References Cited
UNITED STATES PATENTS

| | | | |
|---|---|---|---|
| 2,948,114 | 8/1960 | Beslier | 60/39.28 T |
| 3,019,604 | 2/1962 | Hall | 60/39.28 T |
| 3,098,356 | 7/1963 | Joline | 60/39.28 T |
| 3,158,996 | 12/1964 | Herbert | 60/39.28 T |
| 3,667,218 | 6/1972 | Davis | 60/39.28 T |
| 3,686,859 | 8/1972 | White | 60/39.28 T |
| 3,747,340 | 7/1973 | Fenton | 60/39.28 T |

*Primary Examiner*—Clarence R. Gordon
*Attorney, Agent, or Firm*—Craig & Antonelli

[57] ABSTRACT

Governing device for a gas turbine system, such as a vehicular or aircraft engine, having at least one governor to vary the fuel flow, characterized in that the governor output representing the ratio of fuel flow to one or a combination of engine characteristics is automatically multiplied by that one or combination of engine characteristics to obtain a fuel flow control signal.

7 Claims, 3 Drawing Figures

GOVERNING DEVICE FOR A GAS TURBINE SYSTEM EXEMPLIFIED BY A VEHICULAR OR AIRCRAFT ENGINE

The present invention relates to a governing device for a gas turbine system, such as a vehicular or aircraft engine, having at least one governor to vary the fuel flow.

Governing devices of this type predominately use fuel flow as a governor output control quantity. In gas turbine systems, however, the gas mass flow varies to a large measure. Then when, for instance, the governor input quantity, such as speed variation, is selected to remain of equal magnitude over the operating range, the amplification of the open-loop governing circuit is greatly varied over the operating range in effecting the necessary control. For a number of reasons this condition is undesirable and leads notably to governing error and instability of the governor operation.

A broad object of the present invention is to alleviate or eliminate these disadvantages.

It is a particular object of the present invention to provide a governing system for automatically multiplying the governor output quantity by a characteristic (K) or a combination (K) of parameters of the gas turbine system. The governor output quantity thus becomes specifically the ratio of the fuel flow B to the characteristic K or combination K of parameters or the ratio B/K. Then, when it is intended to govern a characteristic of the gas turbine system, this can be done in the absence of the said disadvantages discussed in connection with prior systems. This holds not only for steady-state operation, but specifically also for acceleration or increase in the rotational speed of a turbine in this system.

One likely characteristic (K) of the gas turbine system for automatic multiplication by a governor output quantity (B/K) is in particular the rotational speed of the turbomachine, an air or gas pressure, an air or gas temperature or a combustion chamber temperature gradient of the gas turbine system. A combination (K) of characteristics or parameters of the gas turbine system for automatic multiplication by a governor output quantity (B/K) is formed in particular of at least part of these characteristics. The air pressure may be, for example, the inlet or outlet pressure of the compressor, and the air temperature, for example, the inlet temperature of the compressor or the combustion chamber inlet pressure.

Introduction of this governor output quantity B/K affords a substantial advantage to gas turbine systems when in a further aspect of this invention the governor output quantity is adjustably limited to a maximum value (B/K) max and a minimum value (B/K) min. The advantage lies in that a maximum fuel flow which is made to vary with the characteristics of the gas turbine system and a minimum fuel flow of the same type will result in such limitations on the operating range as can be conveniently adapted to the performance of a gas turbine system with the aid of no more than two adjusting means. In particular it is the maximum value (B/K) max and the minimum value (B/K) min of the governor output quantity which can be made automatically variable (correction) with a characteristic ($K_1$, $K_2$) or a combination of characteristics ($K_1$, $K_2$) of the gas turbine system. Thus, the influencing of the maximum value and the minimum value of the governor output quantity (B/K) provides a comparatively simple means of improved adaptation of the maximum fuel flow and the minimum fuel flow to the requirements of the control operation.

In accordance with a particular aspect of the present invention, a characteristic (K) or combination (K) of characteristics or parameters as cited in connection with the automatic multiplication is used, depending on the arrangement and application of the gas turbine system, as the said characteristic ($K_1$, $K_2$) or combination ($K_1$, $K_2$) of characteristics for the said correction of the maximum value (B/K) max and the minimum value (B/K) min of the governor output quantity (B/K). To provide for the different requirements imposed on fuel flow control during acceleration and deceleration, the two limits, that is, the said maximum value (B/K) max and the said minimum value (B/K) min, are in most instances influenced discriminately.

Figure 2:
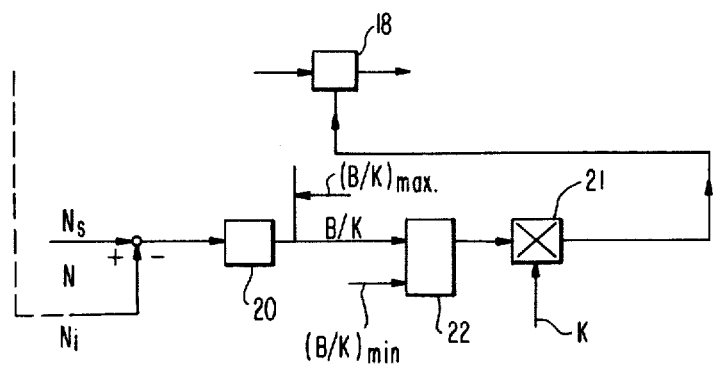
Figure 3:
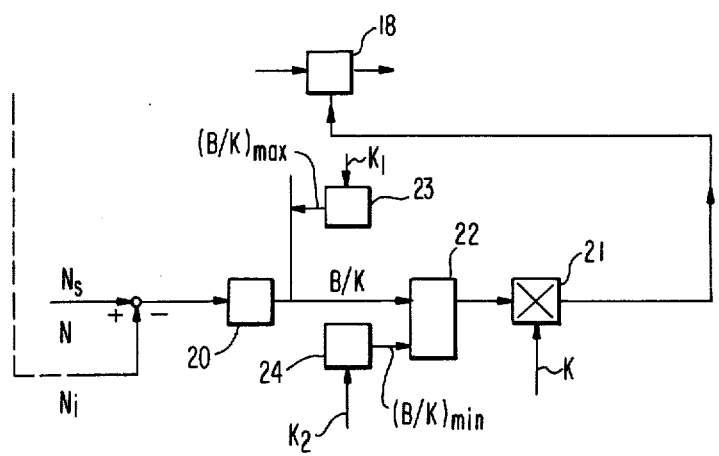

These and other objects, features and advantages will become apparent from the following detailed description when taken with the accompanying drawing, which illustrate several embodiments of the invention, and wherein:

FIG. 1 is a schematic diagram of an embodiment of the governing device in accordance with the present invention in connection with a vehicular gas turbine engine; and FIGS 2 and 3 are schematic diagrams of two further embodiments of the governing device of the present invention, either one of which governing devices can equally be used with the engine of FIG. 1.

The gas turbine engine shown in FIG. 1 is a conventional twospool system having a gas generator turbine 10 to drive a compressor 11 for the combustion air (with excess air) and having a power turbine 12 fitted with a variable stator nozzle 13 to provide effective power through a gearbox 14. The engine further incorporates, as is know, an air heater 15, a combustion chamber 16, a fuel pump 17 and a fuel metering device 18. The function of the engine will become readily apparent from FIG. 1, where the air flow and the gas flows are indicated by arrowheads. Arrowhead 19 indicates the flow of fuel to the combustion chamber 16.

The fuel metering device 18 is under the control of a governing device incorporating a governor 20 of conventional construction to vary the fuel flow, where the regulating variable is the speed N of the gas generator turbine 10. The specified value of N is indicated by $N_s$, and its instantaneous value by $N_i$. The output quantity of the governor 20 in the form of an electrical or equivalent signal is a quotient B/K, where B is the fuel flow and K a combination of engine characteristics. The governing device further embodies a multiplier 21 into which the combination K of characteristics or parameters of the engine is fed automatically and in which the governor output quantity B/K is multiplied automatically by this combination K of characteristics so that the fuel flow B becomes the manipulated variable fed to the fuel metering device 18.

The fuel metering device 18 can also be controlled by a governing device per FIG. 2, in which the governor output quantity B/K is limited to a constant maximum value $(B/K)_{max}$ and a constant minimum value $(B/K)_{min}$. Interconnected in the governing device between the governor 20 and the multiplier 21 in this embodiment is a logic selector circuit 22, for example a simple level detector, which automatically selects the larger of the amounts of the signals "governor output quantity B/K" and "minimum value $(B/K)_{min}$". This serves to greatly simplify the formation of the signals for the minimum limitation. After automatic multiplication in the multiplier 21 of this larger value by the combination K of characteristics, the manipulated variable again becomes the fuel flow B.

The fuel metering device 18 can also be controlled by a governing device per FIG. 3. This governing device can be arranged exactly like that per FIG. 2, except that the maximum value $(B/K)_{max}$ is automatically influenced as a function of a combination $K_1$ of engine characteristics, and the minimum value $(B/K)_{min}$ as a function of a combination $K_2$ of engine characteristics. This is done in a correction schedule 23 for $(B/K)_{max}$, into which the combination $K_1$ of characteristics is fed automatically, and in a correction schedule 24 for $(B/K)_{min}$, into which the combination $K_2$ of characteristics is fed automatically. After automatic selection in the logic selector circuit 22 and automatic multiplication in the multiplier 21, the manipulated variable again becomes the fuel flow B.

The correction schedules 23 and 24 may take the form of any known level adjusting device or arrangement which may in its simplest form comprise a voltage controlled signal generator providing a variable level correction signal responsive to the applied signals $K_1$ and $K_2$.

What we claim is:

1. In a gas turbine system including a combustion chamber receiving combustion air from a turbine driven compressor and a fuel metering device for metering the flow of fuel to said combustion chamber, a governing device for controlling said fuel metering device comprising governor means responsive to a selected engine characteristic to provide an output signal representing the ratio of fuel flow to at least the engine characteristic relating to the rotational speed of a turbomachine in the system and multiplier means connected between said governor means and said fuel metering device and responsive to a regulation signal representing at least the engine characteristic relating to rotational speed for multiplying said output signal of said governor means by said regulation signal, thereby providing a fuel control signal representing required fuel flow to control said fuel metering device.

2. The combination defined in claim 1, wherein said output signal represents the ratio of fuel flow to the engine characteristic relating to the rotational speed of a turbomachine and at least one additional engine characteristic selected from the group consisting of air pressure, gas pressure, air temperature, gas temperature and combustion chamber temperature gradient.

3. The combination defined in claim 1, further including logic means for limiting the output of said governor means applied to said multiplier means to values between selected maximum and minimum values.

4. The combination defined in claim 3, wherein said logic means includes a logic circuit having one input connected to the output of said governor means, a second input connected to a level signal representing a minimum desired value of the governor means output signal and an output connected to said multiplier means.

5. The combination defined in claim 3, wherein said logic means includes a logic circuit which passes the output of said governor means only when it falls between maximum and minimum values, and adjusting means for adjusting the level of said maximum and minimum values.

6. The combination defined in claim 5, wherein said adjusting means is responsive to at least one engine characteristic.

7. The combination defined in claim 6, wherein said output signal represents the ratio of fuel flow to the engine characteristic relating to the rotational speed of a turbomachine and at least one additional engine characteristic selected from the group consisting of air pressure, gas pressure, air temperature, gas temperature and combustion chamber temperature gradient.

* * * * *